US012462455B1

(12) United States Patent
White et al.

(10) Patent No.: US 12,462,455 B1
(45) Date of Patent: Nov. 4, 2025

(54) OPTIMAL MAPPING OF IMMERSIVE VIDEO PRESENTATIONS BETWEEN DEVICES WITH DIFFERENT FORM FACTORS

(71) Applicant: mmhmm inc., Bentonville, AR (US)

(72) Inventors: Stephen James White, San Francisco, CA (US); Phil Libin, Bentonville, AR (US); Leonid Kitainik, San Jose, CA (US)

(73) Assignee: mmhmm inc., Bentonville, AR (US)

( * ) Notice: Subject to any disclaimer, the term of this patent is extended or adjusted under 35 U.S.C. 154(b) by 188 days.

(21) Appl. No.: 18/104,318

(22) Filed: Feb. 1, 2023

Related U.S. Application Data (60) Provisional application No. 63/305,889, filed on Feb. 2, 2022.

(51) Int. Cl.
*G06T 11/60* (2006.01)
*G06T 3/40* (2006.01)
*G11B 27/02* (2006.01)

(52) U.S. Cl.
CPC .......... *G06T 11/60* (2013.01); *G06T 3/40* (2013.01); *G11B 27/02* (2013.01); *G06T 2210/61* (2013.01)

(58) Field of Classification Search
USPC .................................................. 386/230, 248
See application file for complete search history.

(56) References Cited

U.S. PATENT DOCUMENTS

| | | | |
|---|---|---|---|
| 6,456,305 B1 * | 9/2002 | Qureshi | G06F 16/9577 715/788 |
| 9,100,588 B1 * | 8/2015 | Seymour | H04N 5/2723 |
| 9,552,376 B2 * | 1/2017 | Desmond | G06F 16/907 |
| 10,007,350 B1 * | 6/2018 | Holz | G02B 27/0172 |
| 11,263,397 B1 * | 3/2022 | Yu | G06F 40/169 |
| 2005/0278634 A1 * | 12/2005 | Chen | G11B 27/34 |
| 2008/0122734 A1 * | 5/2008 | Sudo | H04N 1/00198 345/1.3 |
| 2008/0276158 A1 * | 11/2008 | Lim | H04N 21/4113 715/201 |
| 2009/0006968 A1 * | 1/2009 | Trask | G06F 16/4393 715/730 |
| 2010/0218100 A1 * | 8/2010 | Simon | G06F 16/4393 715/731 |

(Continued)

*Primary Examiner* — Nigar Chowdhury
(74) *Attorney, Agent, or Firm* — Westborough IP Group, LLC (57) ABSTRACT

Mapping a source video stream to a screen of a target device includes extracting separate objects from the source video stream, identifying a subset of the objects that correspond to a presentation area, and creating a target video stream that is displayed on the target device by arranging the separate objects to enhance the presentation area on the screen of the target device based on a form factor, screen resolution, and/or aspect ratio of the target device. The presentation area may include a presenter and presentation materials. Creating the target video stream may include scaling different ones of the objects. Different scaling factors may be applied to different objects to enhance the presentation area on the screen of the target device. A separate video image corresponding to a linear mapping of the source video stream onto a target device may be provided in addition to the target video stream.

25 Claims, 9 Drawing Sheets

(56) References Cited

U.S. PATENT DOCUMENTS

| | | | |
|---|---|---|---|
| 2011/0083082 A1* | 4/2011 | Gottwald | G06F 16/957 715/744 |
| 2012/0324357 A1* | 12/2012 | Viegers | G06F 16/4393 715/730 |
| 2013/0335628 A1* | 12/2013 | Kuwabara | G06F 3/1438 348/469 |
| 2014/0267438 A1* | 9/2014 | Sosinski | G06T 3/4092 345/666 |
| 2014/0359453 A1* | 12/2014 | Palfreeman | G06F 16/4393 715/731 |
| 2016/0314596 A1* | 10/2016 | Yu | G09B 19/0038 |
| 2017/0078515 A1* | 3/2017 | Shimura | H04N 1/00095 |
| 2018/0095653 A1* | 4/2018 | Hasek | G06F 3/04883 |
| 2018/0204111 A1* | 7/2018 | Zadeh | G06V 10/764 |
| 2018/0268253 A1* | 9/2018 | Hoffman | G06V 10/761 |
| 2019/0103075 A1* | 4/2019 | Magi | G06F 3/1446 |
| 2019/0179916 A1* | 6/2019 | Sivaji | G06F 16/34 |
| 2019/0391391 A1* | 12/2019 | Pazmino | G02B 27/017 |
| 2021/0232632 A1* | 7/2021 | Howard | G06F 16/9038 |
| 2021/0306691 A1* | 9/2021 | Thomas | G06F 16/738 |
| 2022/0066725 A1* | 3/2022 | Xia | G06F 3/0488 |
| 2022/0132020 A1* | 4/2022 | Magpayo | H04N 21/2143 |
| 2022/0179665 A1* | 6/2022 | Rathod | G06F 9/451 |
| 2022/0374590 A1* | 11/2022 | Seth | G09B 5/06 |
| 2023/0055241 A1* | 2/2023 | Zionpour | G06F 16/958 |

* cited by examiner

OPTIMAL MAPPING OF IMMERSIVE VIDEO PRESENTATIONS BETWEEN DEVICES WITH DIFFERENT FORM FACTORS

CROSS-REFERENCE TO RELATED APPLICATIONS

This application claims priority to U.S. Prov. App. No. 63/305,889, filed on Feb. 2, 2022, and entitled "OPTIMAL MAPPING OF IMMERSIVE VIDEO PRESENTATIONS BETWEEN DEVICES WITH DIFFERENT FORM FACTORS", which is incorporated herein by reference.

TECHNICAL FIELD

This application is directed to the fields of video recording, visual communications, mobile computing, and user interfaces, and more particularly to the field of optimal mapping of immersive video presentations between devices with different form factors.

BACKGROUND OF THE INVENTION

Interactive video content is playing an important and constantly increasing role in the emerging hybrid lifestyle. By some estimates, video content represents the single most valuable source of information for 66% of Internet viewers; it made about 82% of all online traffic in 2022. Additionally, live, and pre-recorded videos are rapidly emerging as the dominant productivity medium in many areas, including training and instructional materials, education, marketing, e-commerce, product support and development, business presentations and communications, etc.

The worldwide market of video marketing is expected to increase from $33 billion in 2020 to almost $46 billion by 2025. An estimated 55% of Internet users and 66% of the US teens are watching online videos daily, while 78% of overall viewers are watching online videos every week. Additionally, over 95% of Internet users watch explainer videos to learn more about a product or service.

According to market research, video presentations constitute the third most popular type of video content. A growing trend in video presentations is associated with the use of AR (Augmented Reality) and immersive technologies that are combining realistic interior views and real-life objects with simulated virtual models and environments; such hybrid real/virtual videos are increasing productive, aesthetic, and entertaining appeal and are creating new educational and productivity opportunities for video content and communications. An important part of this trend is the use of new immersive experiences introduced in the mmhmm software and finding applications of the mmhmm software (and similar software) in Zoom, Microsoft Teams, and other products when a presenter or a group of co-presenters are captured by front cameras, segmented out of the ordinary background, and immersed in front (or behind) of slide decks and other presentation materials. Multiple features, such as moving presenters across the presentation materials, resizing presenter images, and aligning the presenters with slides, background and foreground objects and other presentation components, color, and audio effects, are enhancing presentability and efficiency of videos.

Depending on the type of video content, which may be ranging from vlogs (video blogs) to testimonials, from business presentations to media shorts, and from product reviews to tutorials, authors may utilize a variety of tools, devices, equipment, and software. Full-blown video presentations with slides, complex background and foreground objects and immersive presenter(s) are often created on desktop or notebook computers with high-resolution screens and cameras, such as the industry standard Full HD 1080p; even higher resolution (4K-5K-8K) screens and cameras may be used, which provide for a high-quality video content but may be demanding for the users (viewers) of the videos.

Recent research shows that 57 to 75 percent of global videos are watched on mobile devices, such as smartphones and tablets. Global video viewing volume on smartphones exceeds computer viewing of videos by 11%. Additionally, 90% of mobile users are watching videos in vertical formats, subject to general preferences for smartphone usage and viewing and to the proliferation of popular vertical video formats, such as Instagram's and TikTok's 9:16 aspect ratio. A straightforward conversion of Full HD videos (captured in landscape desktop and notebook formats) to vertical mobile formats via direct scaling typically results in small, poor-quality videos and may gravely affect the proliferation of video presentations and other types of video content across online and local audiences.

SUMMARY OF THE INVENTION

Notwithstanding major developments in creating high-quality, diversified, and immersive video content, the problem of reproducing high quality videos on devices with various form factors and viewing modes, has not been sufficiently addressed and may significantly degrade the efficiency of video presentations for the mass audience.

Accordingly, it is important to be able to provide optimal mapping of video presentations between devices with different form factors and viewing preferences.

According to the system described herein, mapping a source video stream to a screen of a target device includes extracting separate objects from the source video stream, identifying a subset of the objects that correspond to a presentation area, and creating a target video stream that is displayed on the target device by arranging the separate objects to enhance the presentation area on the screen of the target device based on at least one of a form factor, screen resolution, and aspect ratio of the target device. The presentation area may include at least one presenter and presentation materials. The presentation materials may include slides, videos, or/or demonstration models. Creating the target video stream may include scaling different ones of the objects. Different scaling factors may be applied to different ones of the objects to enhance the presentation area on the screen of the target device. Extracting separate objects may include building a scene graph that represents interactions between the objects and other activities and processes occurring in the source video stream. Edges of the scene graph may represent relationships of objects connected by the edges. Building the scene graph may include accessing data from a video authoring tool that is used to create the source video stream. Mapping a source video stream to a screen of a target device may also include building a sequence of segments corresponding to different ones of the scene graphs at different times and building a storyboard based on differences between time adjacent ones of the segments. The objects may be rearranged to enhance the presentation area on the screen of the target device in response to one of the segments causing at least a portion of the presentation area to be deemphasized. A template corresponding to the target device may be used to determine how to arrange the separate objects to enhance the presentation area on the screen of the target device. The template may include replacement recommendations for certain ones of the objects. The template may include an area designated for an image of a presenter and an area designated for a slide deck referenced by the presenter. The template may include an area that is an overlap of the area designated for the image of the presenter and the area designated for the slide deck. The template may position the slide deck at a top right corner of the screen of the target device and may be sized to fit up to 10% from a left edge of the screen of the target device and up to 15% from a bottom edge of the screen of the target device. The template may size the image of the presenter to be up to 50% of a height of the target video stream that is displayed on the target device and may be positioned to be located left of a left edge of the slide deck. None of the objects may correspond to a slide deck and the template may size the image of a presenter to be up to 70% of a height of the target video stream that is displayed on the target device and may position the image of the presenter to be in a middle section of a bottom portion of the target video stream that is displayed on the target device. The template may position the slide deck at a top right corner of the screen of the target device and may be sized to fit up to 1% from a left edge of the screen of the target device and up to 2% from a bottom edge of the screen of the target device. The template may size the image of the presenter to be up to 30% of a height of the target video stream that is displayed on the target device and may be positioned to be located below a bottom edge of the slide deck. None of the objects may correspond to a slide deck and the template may size the image of a presenter to be up to 50% of a height of the target video stream that is displayed on the target device and may position the image of the presenter to be in a center portion of the target video stream that is displayed on the target device. A separate video image corresponding to a linear mapping of the source video stream onto a target device may be provided in addition to the target video stream. Linear mapping with direct rescaling may be used to represent objects from the source video stream onto the target device using relative parameters of the objects. The relative parameters may include object sizes, object locations, object motion, object resizing, object fading, object morphing, and/or object transparency. The presentation materials may contain text that is reformatted on the target device to enhance the presentation area.

According further to the system described herein, a non-transitory computer readable medium contains software that maps a source video stream to a screen of a target device. The software includes executable code that extracts separate objects from the source video stream, executable code that identifies a subset of the objects that correspond to a presentation area, and executable code that creates a target video stream that is displayed on the target device by arranging the separate objects to enhance the presentation area on the screen of the target device based on at least one of a form factor, screen resolution, and aspect ratio of the target device. The presentation area may include at least one presenter and presentation materials. The presentation materials may include slides, videos, or/or demonstration models. Creating the target video stream may include scaling different ones of the objects. Different scaling factors may be applied to different ones of the objects to enhance the presentation area on the screen of the target device. Extracting separate objects may include building a scene graph that represents interactions between the objects and other activities and processes occurring in the source video stream. Edges of the scene graph may represent relationships of objects connected by the edges. Building the scene graph may include accessing data from a video authoring tool that is used to create the source video stream. The software may also include executable code that builds a sequence of segments corresponding to different ones of the scene graphs at different times and executable code that builds a storyboard based on differences between time adjacent ones of the segments. The objects may be rearranged to enhance the presentation area on the screen of the target device in response to one of the segments causing at least a portion of the presentation area to be deemphasized. A template corresponding to the target device may be used to determine how to arrange the separate objects to enhance the presentation area on the screen of the target device. The template may include replacement recommendations for certain ones of the objects. The template may include an area designated for an image of a presenter and an area designated for a slide deck referenced by the presenter. The template may include an area that is an overlap of the area designated for the image of the presenter and the area designated for the slide deck. The template may position the slide deck at a top right corner of the screen of the target device and may be sized to fit up to 10% from a left edge of the screen of the target device and up to 15% from a bottom edge of the screen of the target device. The template may size the image of the presenter to be up to 50% of a height of the target video stream that is displayed on the target device and may be positioned to be located left of a left edge of the slide deck. None of the objects may correspond to a slide deck and the template may size the image of a presenter to be up to 70% of a height of the target video stream that is displayed on the target device and may position the image of the presenter to be in a middle section of a bottom portion of the target video stream that is displayed on the target device. The template may position the slide deck at a top right corner of the screen of the target device and may be sized to fit up to 1% from a left edge of the screen of the target device and up to 2% from a bottom edge of the screen of the target device. The template may size the image of the presenter to be up to 30% of a height of the target video stream that is displayed on the target device and may be positioned to be located below a bottom edge of the slide deck. None of the objects may correspond to a slide deck and the template may size the image of a presenter to be up to 50% of a height of the target video stream that is displayed on the target device and may position the image of the presenter to be in a center portion of the target video stream that is displayed on the target device. A separate video image corresponding to a linear mapping of the source video stream onto a target device may be provided in addition to the target video stream. Linear mapping with direct rescaling may be used to represent objects from the source video stream onto the target device using relative parameters of the objects. The relative parameters may include object sizes, object locations, object motion, object resizing, object fading, object morphing, and/or object transparency. The presentation materials may contain text that is reformatted on the target device to enhance the presentation area.

The proposed system optimally maps video presentations between multiple devices with different screen resolutions, sizes and aspect ratios using linear and non-linear mapping mechanisms; the system identifies scene objects and backgrounds based on authoring scenarios and on pools of recognition technologies, builds dynamic scene graphs and automatically constructs storyboards of source presentations, recreating target videos in relative coordinates, creating scene templates for different form factors, adding transitions to segments of target videos, offering advanced mechanisms for processing text slides and recommending on-demand assistive linear fragments for target videos.

Various aspects of system functioning are explained as follows.

1. Overview of mapping tasks vs. video resolution, screen size and aspect ratios. Presentation videos are built, for the most part, on Mac and Windows notebooks, desktops and workstations and can be replayed by viewers on a variety of desktop and mobile devices with different form factors, screen resolutions, and commonly accepted video aspect ratios. A variety of screen resolutions: Full HD 1080p, WUXGA (1920:1200), Standard HD 720p, 2K (QHD) 1440p, 4K and 8K UHD is combined with the constantly growing assortment of aspect ratios-16:9, 21:9, 4:3 for desktop monitors, 4:3 for mainstream iPad tablets, 10:7 for iPad Pro and 16:10 for Android tablets, 9:18, 9:19.5, 9:20 for smartphones (all latest iPhones are 9:19.5, and iPhone 13 has a customizable video capturing aspect ratio 4:3, 1:1 and 16:9). Additionally, popular video applications have their own preferred video capturing aspect ratios, such as tik-tok's and Instagram's 9:16 and 1:1 and additional Instagram's 4:5 and 1.91:1 format. Broad diversity of screen, application and video capturing window size requirements and options makes an adequate viewing of video presentations across different devices a challenging task.

2. Mapping mechanisms. The proposed mapping system has two classes of mechanisms for mapping video presentations, especially the immersive video presentations, such as recorded with mmhmm, from a source video on an original capturing device to a target video on a device chosen by a viewer: linear mapping mechanisms and non-linear mapping mechanisms:

With a linear mapping (examples are presented below), every frame of the target video is a view through the screen of the target device—or, more precisely, through the video view window of a replay application—of a certain frame of the source video, which may be proportionally rescaled. In other words, each linear mapping mechanism is a dynamic zoom-and-crop (or zoom-and-pan) sequence of the source video frames. A linear mapping may not necessarily have a one-to-one correspondence between sequences of the source and the target frames. For example, when the target frames have a significantly smaller size than the source frames due to limitations of the target device, the system may interrupt the source presentation on the target device, freeze a source frame and view different parts of the source frame with different zoom levels. A property of a linear mapping is keeping the proportions of the source video. The linear mapping may lose part of the content through cropping the original frames, but there is no distortion of the retained portions. For example, if a presenter points with her finger to a certain content on a slide, then the presenter pointing with her finger to the certain content on the slide will be seen in the target video, as long as both the presenter and the slide content are visible on the target frames and are not cropped. A linear mapping attempts to tell the same story as the source video using different focal points and magnification levels.

A non-linear mapping does not necessarily retain object proportions of the source video. The non-linear mapping may extract objects from the frames of the original video, rearrange the objects, scale different objects by different factors, move objects by different trajectories compared with the source video, etc., adapting the target presentation to the target device, including adapting to the screen size, resolution, and aspect ratio of the target device. A non-linear mapping attempts to adapt and optimize the story to the target device and uses specific tools for such adaptation and optimization, as explained below and illustrated in the drawings.

3. Examples of linear mapping mechanisms.
(i) Straightforward rescaling. This is the most basic mechanism that rescales all frames of the source video by the same factor—the unique coefficient that puts the frame into the viewing window of the target device filling one of the dimensions of the target device. Linear mapping may work reasonably well when the source device and the target device have similar screen sizes, resolutions and aspect ratios, but may not be applicable when the difference between the source device and the target device is significant, such as mapping of a video created on MacBook Pro to an iphone XR.

(ii) Recreating target video in relative coordinates. This mechanism of linear mapping uses knowledge about the scene graph of a source video, i.e., about the objects (for example, backdrop/room, presenter(s), slides) and represents sizes, locations, motion, resizing, visual effects, etc. in relative parameters; thus, object sizes and coordinates may be measured in percentages of one or both dimensions of overall frame dimensions, while fading, morphing or transparency effects may be measured in percentages of maximum values of the effects over time. With this mechanism, a target video may be recreated by reproducing the initial frame on the target device following the relative parameters and then following all relative changes in the source scene frame-by-frame, as recorded for the source video, transferring the changes to the target video. Just like with straightforward rescaling, recreating a target video in relative coordinates may work well for similar source and target devices and may be problematic for significant screen differences between the devices.

(iii) Identifying and following presentation areas. This mechanism may work best for presentation videos, such as immersive presentation recordings created in mmhmm software where there are presenter(s) and presentation materials, such as a slide deck. As with creating target videos in relative coordinates, the scene graph may play a role by being used to identify presentation areas in subsequent frames of the source video—for example, a stable minimal bounding box containing the presenter(s) and the slide for a sufficient period. Once such a bounding box is detected, the rest of the frame content may be cropped and the presentation area within the bounding box may be proportionally rescaled to fit the target device to thus enhance viewing the presentation area at the target device when a portion of the source presentation is transferred frame-by-frame into the target device. After the presentation area changes (for example when a slide is opened to a larger (full) size and a presenter or multiple co-presenters are moved outside the new slide area to avoid interfering with the presentation content), the system may redefine a presentation area and provide a transitional segment of the target video (potentially absent in the source video) for a smooth transition to the next fragment of the presentation.

4. Scene graph. The efficiency of all non-linear mapping mechanisms and of some of the linear mechanisms (for example, 3 (ii) and 3 (iii) above) may depend on the ability of the system to build and maintain a scene graph that represents all scene objects, interactions between objects, and other activities and processes occurring during the source presentation. The scene graph may include, as a minimum, descriptions of the following entities, considered graph nodes (or hypernodes):
  (i) Scene background (rooms, backdrops, walls, textures, shaders, and other components of the background environment).
  (ii) Foreground objects, such as furniture, books, art, equipment, separate buildings and structures, transport, etc., depending on the scene content.
  (iii) Presenter(s) and other participants of the source video recording.
  (iv) Presentation materials (slides, videos, demonstration models, etc., possibly associated with the background and with the foreground objects).

Edges of the scene graph may represent interactions between nodes. For example, presenters may be associated with the armchairs the presenters are occupying during the presentation via the alignment edges; the same presenters may be associated with the current slide by presentation edges. The scene graph may be both a hypergraph—for example, a background node may combine a room type and description, lighting source(s), textures or wallpapers on the walls and a programmatic shader displayed on one of the surfaces, and a multigraph, so that two nodes may be connected by multiple edges. Thus, a node for a presenter whose image is aligned with a column of a table on a slide as a "live pointer", may be connected to the node corresponding to the slide both by an alignment edge and a presentation edge.

5. Authoring scenario and technology pool. If a source video is recorded within an authoring tool, such as the mmhmm software, where the scene graph and objects within scenes are created or added at the authoring phase, the scene graph may be inherited by the source video, at least partially, from the authoring scenario. In a situation where the source video has unknown authoring software or the software is not dealing with scene definitions and object manipulations, a scene graph may be built by using a technology pool, including facial, image, speech, gesture, optical character (OCR), and other recognition technologies.

6. Building a storyboard for source video. For efficient functioning of non-linear mapping technologies, the technologies are applied to a well-segmented source video where the target presentation takes advantage of relatively stable segments of the video allowing efficient arrangement of objects in the target version of the scene. If the source video is built based on a storyboard, the storyboard may be used for mapping, and source presentation segments between adjacent elements (design frames) of the storyboard may be used as candidates for the subsequent mapping steps. Alternatively, a storyboard may be built based on the dynamics of the scene graph. Specifically, a new segment may be started when the scene graph significantly changes compared with a current structure and parameters of the scene graph; changes may occur in the nodes and/or edges: for example, a presenter may leave the initial position and align an image of the presenter with a portion of the slide content; or the presenter may point to the slide; or a new slide may be displayed; or a co-presenter may enter or leave the presentation area; etc.

7. Steps of non-linear mapping. The process of non-linear mapping may include the following:
  (i) Build the sequence of scene graphs for the source video.
  (ii) Build the storyboard of the source video based on dynamic changes in the scene graph (i.e., on differences between time adjacent ones of the scene graphs).
  (iii) For each segment of the storyboard, build a segment of the target video that follows the source video and optimizes (enhances) visibility of key objects in the target video based on the parameters of the target device. For example, when a storyboard segment includes a talk fragment of a static presenter without gesticulation or pointing to the presentation materials, the system may increase the size of the slide and decrease the size of an image of the presenter below default values.
  (iv) If necessary, connect segments of the target video by transitions, morphing or other intermediate frames.

8. Template driven non-linear mapping. For certain types of presentation videos, non-linear mapping may utilize design templates built for various types of target devices by determining default or recommended positions and sizes of key objects in the scene, especially a slide and a presenter. For example, recommended slide and presenter locations and sizes for a Full HD 1080p screen could be:
  If both the slide and the presenter are in the scene,
    The slide has a fixed distance of 1% (both dimensions) from the top right corner of the scene and may size itself to fit up to 10% from the left, 15% from the bottom.
    The image of the presenter may size up to 50% of the scene height and must be located to the left of the current left edge of the slide so as not to obstruct content of the slide and intersect with the slide only if the latter has a sufficient blank space so the intersection area has no slide content.
  If the slide is absent, the image of the presenter may size up to 70% of the scene height and the preferred location may be in the middle bottom portion of the scene.

For a target device viewed in the vertical portrait mode, such as an iPhone with an aspect ratio 9:19.5, the design template may have different default/recommended values; for instance:
  If both the slide and the presenter are in the scene,
    The slide has a fixed distance of 1% (both dimensions) from the top right corner of the scene and may be sized to fit up to 1% from the left, 2% from the bottom (to allow larger size of slides)
    The image of the presenter may size up to 30% of the scene height and be located below the slide by at least 5% of the screen height.
  If the slide is absent, the image of the presenter may size up to 50% of the scene height and a preferred location may be in the center of the scene.

Additionally, design templates may include alternative feature lists and feature replacement recommendations for certain features. Thus, mmhmm software allows moving an image of a presenter around the screen, changing size, color, and transparency of the image, and aligning the image to portions of the slide (for example, with columns or rows of a table) to combine presentation talk with pointing to content by the location of the image of the presenter. For smaller form factors, the alignment feature may prove impractical for target videos, because the size of the image of the presenter may become tiny after resizing. In this case, a non-linear mapping mechanism may replace the alignment feature with a different type of pointer—for example, a circle with a pointer, where the image of the presenter is placed inside the circle.

9. Assistive linear fragments of target video. While the non-linear mappings of videos are, generally speaking, better adapted to each form factor of the target devices, non-linear mappings of videos often deviate from the source videos more significantly than linear mappings. Therefore, in certain situations, the system may produce simultaneous segments of linear mappings and offer the simultaneous segments on demand to viewers who wish to investigate details of the original source presentations. The simultaneous segments may lose in visual quality but gain in precision of reproduction of the original content and supplementary use of the simultaneous segments may be beneficial for viewers of target videos.

10. Processing and mapping videos with text slides. Slides and other presentation materials with predominantly text content may allow more processing and mapping flexibility than other types of presentation materials, since slides and other presentation materials with predominantly text content may be accessible as editable text from the authoring scenario or may be converted to an editable format using OCR and other text recognition technologies. Editable text on a slide may be formatted and arranged on modified slides for target videos in many ways without any deviation from the meaning of the original source slides.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for an automatic optimal mapping of video presentations and other types of video content between devices with different form factors.

Figure 1:
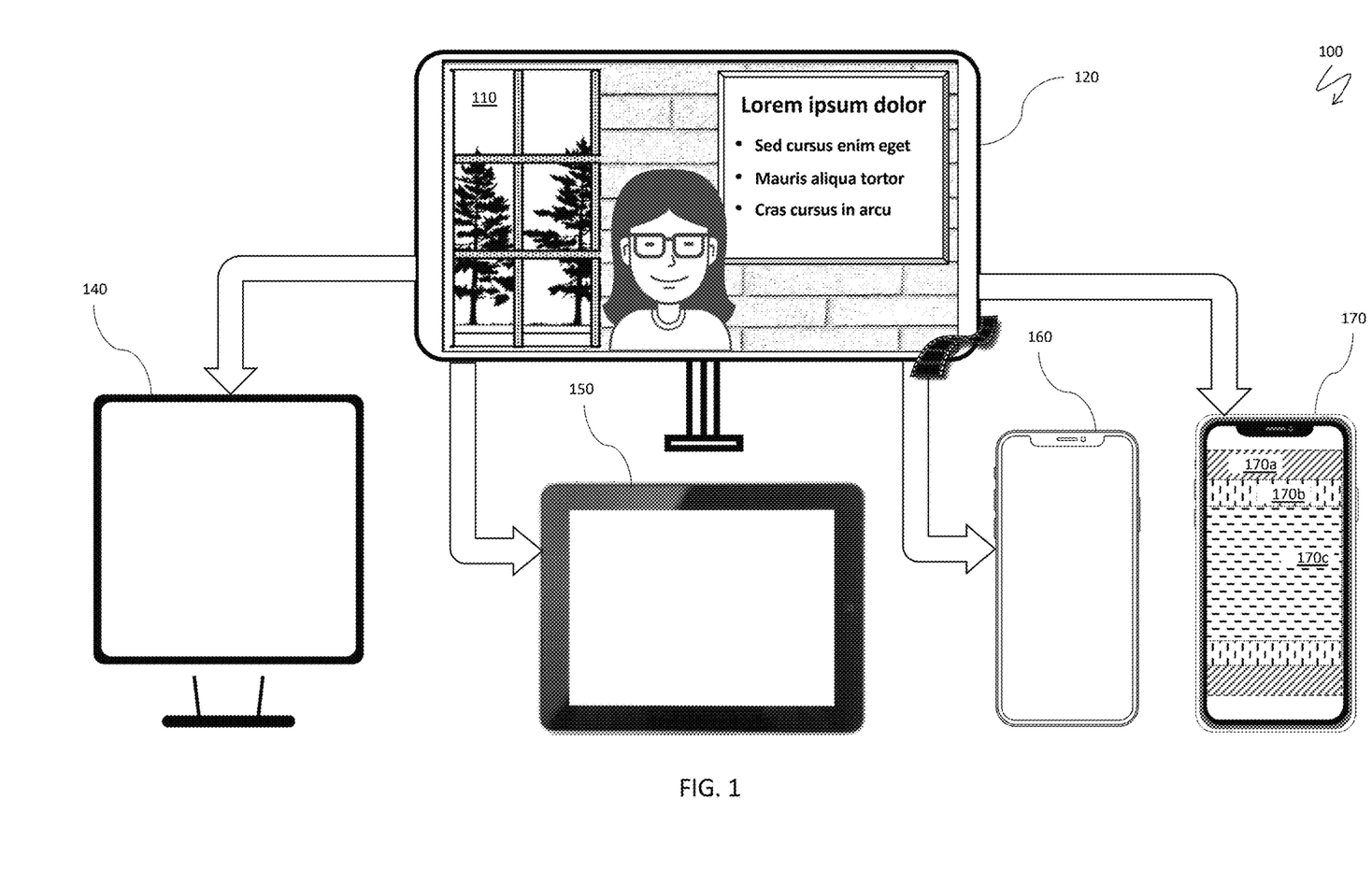
FIG. 1 is a schematic illustration of source and target devices for video presentations, according to an embodiment of the system described herein.

FIG. 1 is a schematic illustration 100 of source and target devices for video presentations. A video presentation 110, originally created and recorded on a computer with a landscape screen 120 having an aspect ratio 16:9 is offered to an audience using multiple desktop and mobile devices with a variety of screens and aspect ratios, including a desktop screen 140 with an aspect ratio 1:1, a mobile screen 150 with an aspect ratio 4:3, a smartphone screen 160 with an aspect ratio 9:19.5, and a smartphone screen 170 with variable aspect ratios 9:16 (170a), 3:4 (170b), and 1:1 (170c), emulated by the operating system and adaptable by the user or automatically for viewing different types of images and video content.

Figure 2:
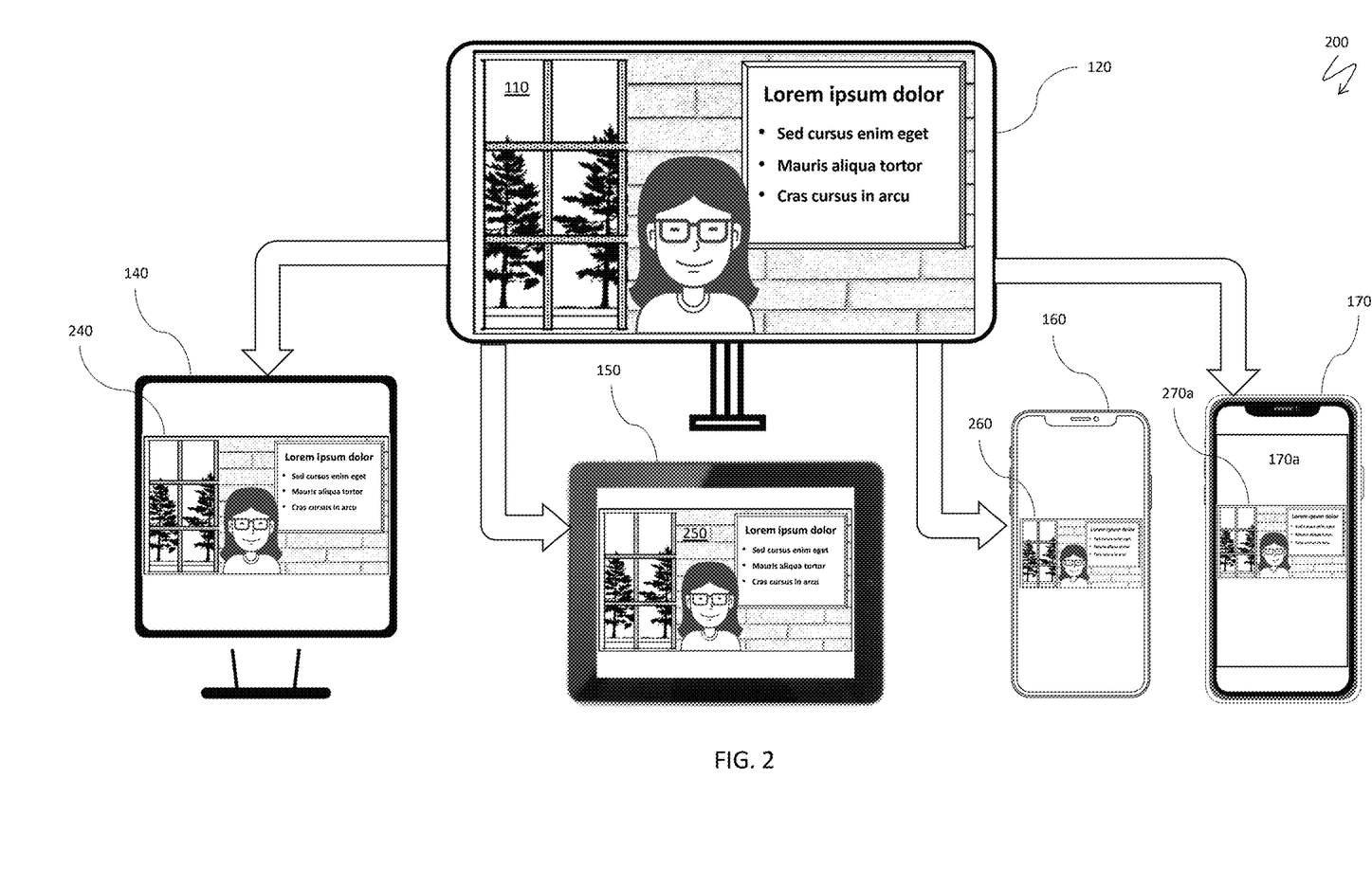
FIG. 2 is a schematic illustration of basic linear mapping with straightforward rescaling, according to an embodiment of the system described herein.

FIG. 2 is a schematic illustration 200 of basic linear mapping with straightforward rescaling. As in FIG. 1, the video presentation 110 has been originally created and recorded on a computer with the landscape screen 120 having an aspect ratio 16:9. The presentation 110 is offered to an audience using multiple desktop and mobile devices and is directly rescaled so that the original presentation screen optimally fits the target aspect ratio, potentially leaving significant blank spaces on each of the target screens, as shown by rescaled videos 240 for the target screen 140, a rescaled video 250 for the target screen 150, a rescaled video 260 for the target screen 160, and a rescaled video 270 a for an emulated target screen 170a on the smartphone screen 170.

Figure 3:
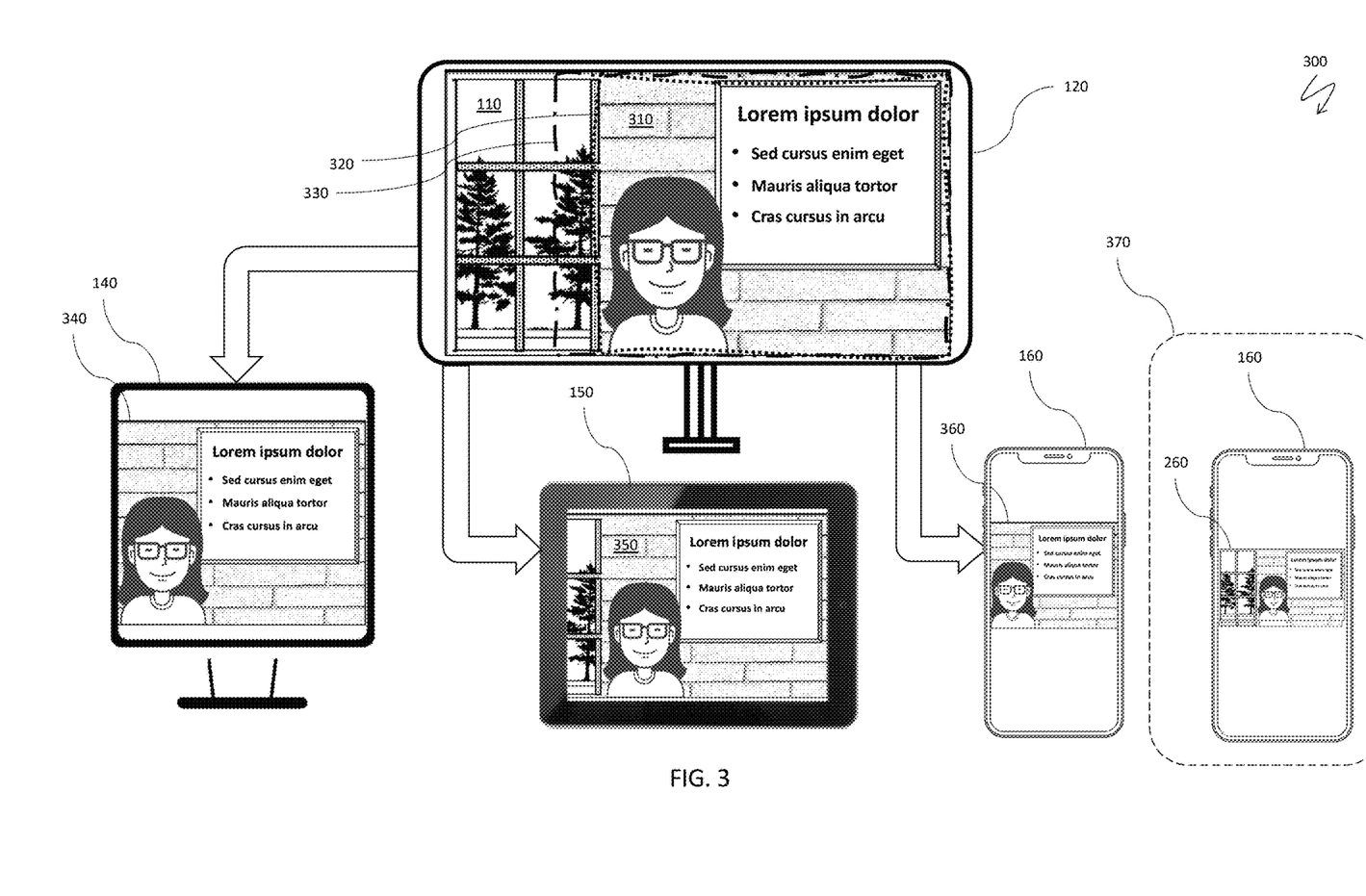
FIG. 3 is a schematic illustration of a linear mapping with an identified presentation area, according to an embodiment of the system described herein.

FIG. 3 is a schematic illustration 300 of a linear mapping with an identified presentation area. With linear mapping with an identified presentation area, the system analyzes the presentation 110 originally created for the screen 120 and searches for a presentation area 310, a part of the presentation screen that includes all substantial changes to the presentation, including slides or other presentation materials. Immersive image of the presenter and other background and foreground objects are essentially included in the presentation flow. In FIG. 3, two options of the presentation area are offered, indicated by two frames 320, 330 with different line styles, which are adapted to different form factors. The presentation area 310 with the frame 320 is mapped as the presentation 340 onto the screen 140 and as a linear mapping 360 onto the screen 160; the frame 330 is used for mapping a presentation 350 onto the screen 150 (see FIG. 1 and the accompanying text for more information on screens and aspect ratios). An illustration 370, showing the rescaled video 260 on the smartphone 160 from FIG. 2 next to the linear mapping 360 with an identified presentation area shows the higher quality and legibility of the linear mapping 360.

Figure 4:
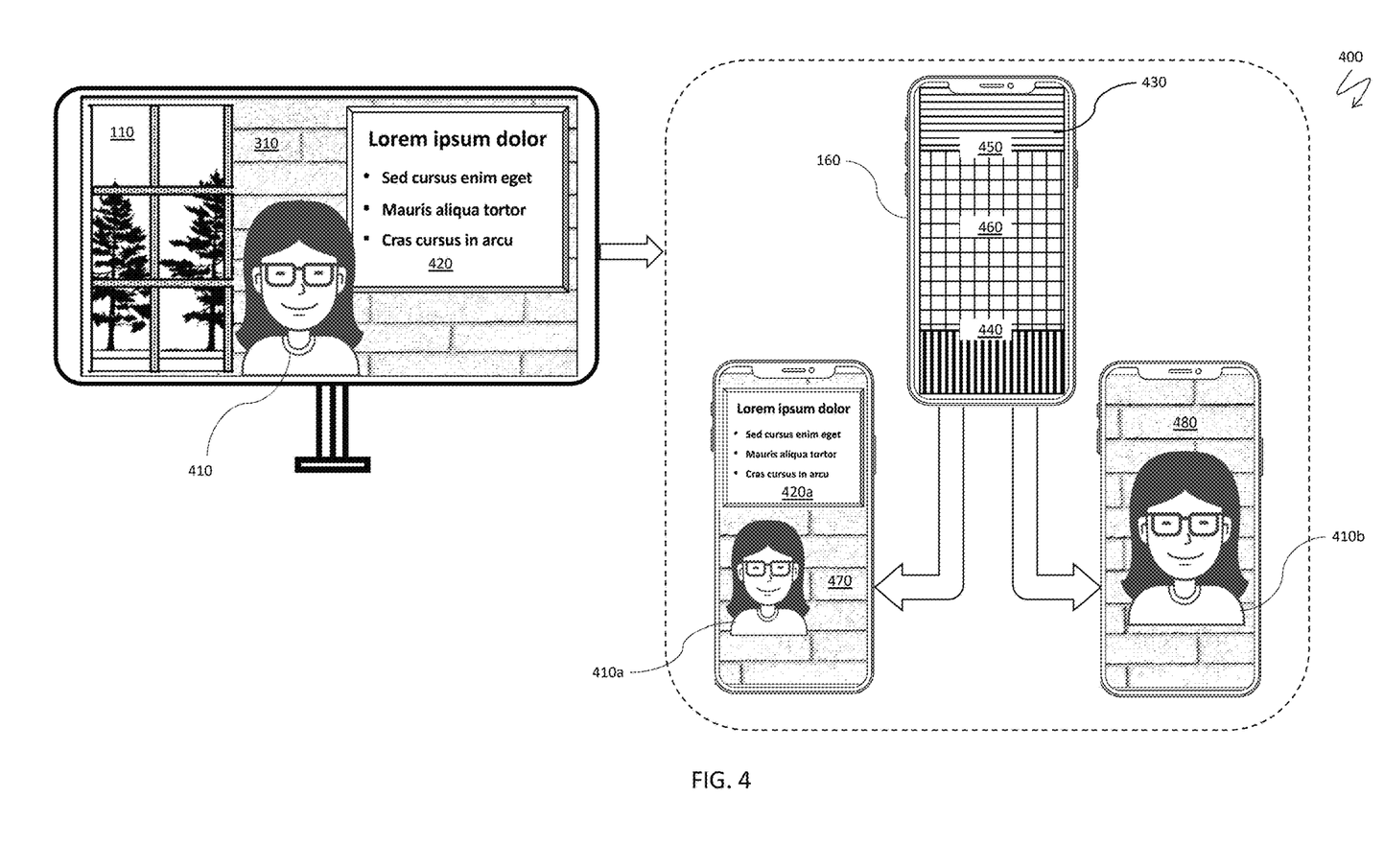
FIG. 4 is a schematic illustration of a template-driven non-linear mapping, according to an embodiment of the system described herein.

FIG. 4 is a schematic illustration 400 of a template-driven non-linear mapping. To use template-driven non-linear mapping, the system may analyze the video presentation 110 using the presentation area 310 (see FIG. 3 and the accompanying text for details) and recognize key presentation items. In FIG. 4, two key presentation items are discovered: the presenter 410, and a slide deck 420.

A template 430, designed for the screen of a target device to which the video presentation should be optimally mapped, is shown in FIG. 4 for the two key presentation items, the presenter 410, and the slide deck 420, applied to the smartphone screen 160 (see FIG. 1 for details). The template 430 defines a range of locations for each key presentation item. For the template 430, an area 440 is designated for an image of the presenter, an area 450 for the slide deck and an area 460 is the overlap of the areas 440, 450, where any of the two key presentation items may be located. Two examples of target device friendly, template-driven non-linear mappings of the video presentation 110 to the smartphone screen 160 are as follows: a mapping 470 places a slide 420a at a maximum screen size above an image of the presenter 410a, which is also enlarged compared with images of the presenter for the screen 160 found in FIGS. 2, 3; a mapping 480 shows a portion of presentation where the presenter does not refer to the slide deck, which is eliminated from the screen 160, and an image of the presenter 410b occupies a maximum available space in the center of the screen 160.

Figure 5:
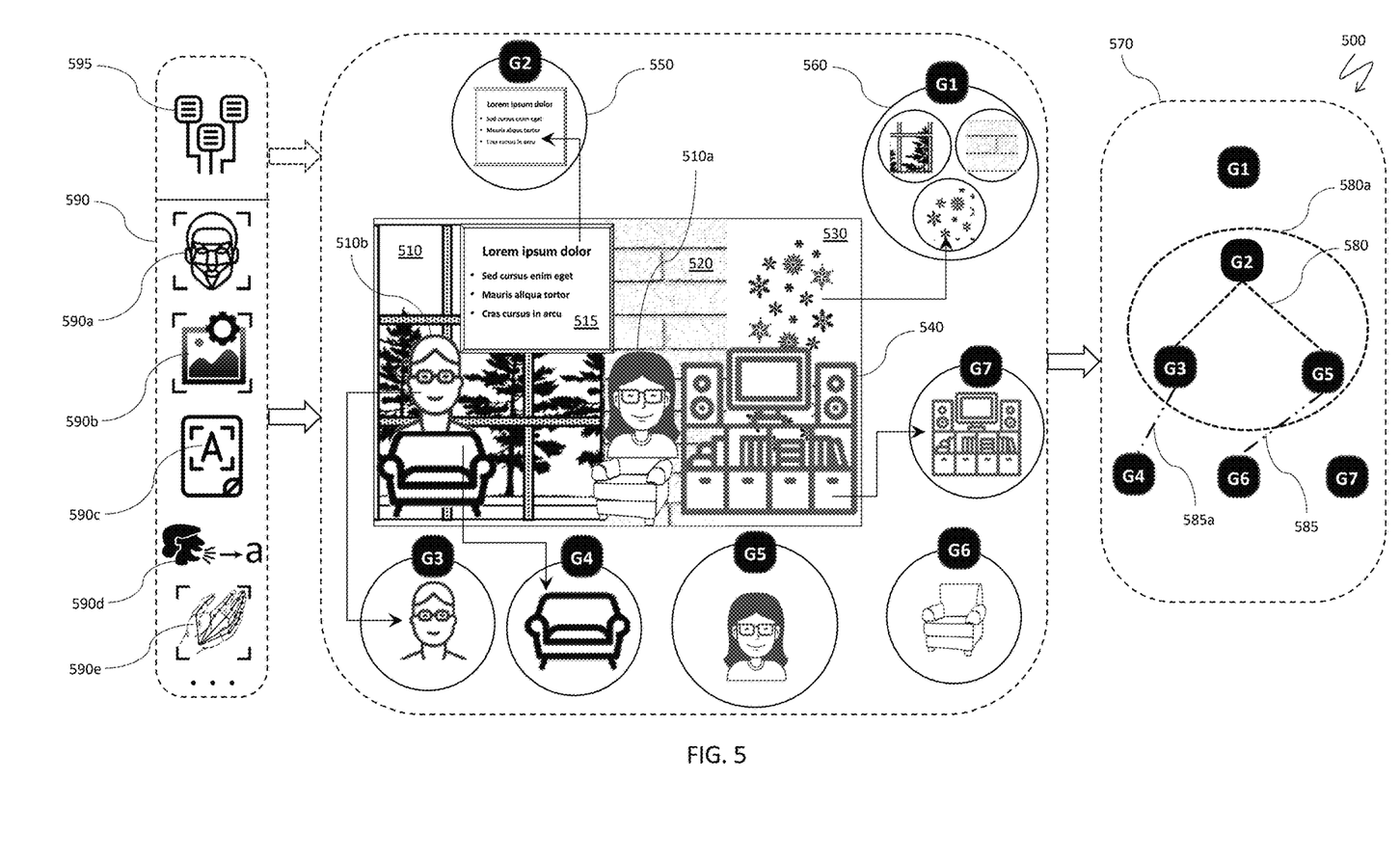
FIG. 5 is a schematic illustration of building a scene graph for a source video, according to an embodiment of the system described herein.

FIG. 5 is a schematic illustration 500 of building a scene graph for a source video. Subsequent presentations scenes 510 (frames of the video presentation or other video content) are parsed by the system, and different types of objects (including key presentation items, see FIG. 4 and the accompanying text) are extracted and added to a set of nodes of the scene graph. FIG. 5 shows several types of such objects: presenters-a main presenter 510a and a co-presenter 510b; presentation materials-a slide deck 515; background objects-a backdrop 520, subdivided into two areas (brick wall and window with a garden view), a dynamic shader 530; and foreground objects 540, such as furniture and appliances. Each object may be added to a regular node 550, containing a single object, or a hypernode 560, grouping multiple objects; thus, the regular node 550 (G2) corresponds to a single object—the slide deck 515, while the hypernode 560 (G1) describes the background of the presentation scene, combining different background components.

A scene graph 570 for the presentation scene 510 or a sequence of such scenes characterized by a stable set of associated objects, includes the nodes of types 550, 560 (regular and hypernodes) and edges 580, 580a, 585, 585a connecting the nodes and describing interaction between the nodes. There may be many different types of edges for different interaction types; additionally, edges may connect two individual nodes or subsets of nodes (hyperedges); also, two nodes may be connected by multiple edges of different types, as explained elsewhere herein (see, for example, Section 4 of the Summary), which makes the scene graph a so-called multi-hypergraph.

FIG. 5 shows two types of edges and two categories of edges of the scene graph 570. A conventional binary (node-to-node) edge 580 defines an interaction of the presentation type and describes the presentation made by the presenter 510a using the slide deck 515. A hyperedge 580a of the hyperedge category connects three nodes corresponding to the objects, which are the presenter 510a, the co-presenter 510b, and the slide deck 515; the hyperedge 580a describes joint presentation by the presenter 510a and the co-presenter 510b, which may also include an interaction (dialog) between the presenters 510a, 510b, so that all three nodes constitute one interconnected presentation entity. Two other edges 585, 585a belong to a different type of interaction, a spatial (geometric) alignment between objects-note the dash-dotted denotation differentiating the alignment edges 585, 585a from the dashed presentation edges. The two edges 585, 585a describe an alignment between the images of the presenter 510a/co-presenter 510b and the armchairs of the presenter 510a and the co-presenter 510b. Such interaction may be dynamic, since each of the edges 585, 585a (and alignments represented by the edges 585, 585a) may be temporarily broken, for example, when the presenter 510a or the co-presenter 510b move closer to the slide deck 515, potentially aligning with the slide content (and causing the connection between the presenter 510a/co-presenter 510b node and the slide deck 515 node to become multi-edged, representing both the presentation and the alignment interactions). Subsequently, the alignment between the presenter 510a/co-presenter 510b and the armchairs of the presenter 510a and the co-presenter 510b may be restored, returning the edges 585, 585a to the scene graph 570.

The process and complexity of building scene graphs for video presentations may depend on the class of authoring tools used by the creators of the videos. If an authoring tool is an advanced application, allowing synthesis of presentation scenes from physical objects (pre-recorded or recorded in real time) and virtual (AR) objects, immersive presence of presenter(s), interactive object manipulations and other innovative features, then most of the object structures, and possibly interactions, underlying the scene graph may be already present in the authoring tool and may be inherited by the source videos and transferred to the mapping system. This is illustrated by a dashed arrow leading from an authoring scenario 595 to a composition module of the scene graph 570, whereby the objects 510a, 510b, 515, 520, 530, 540 are simply extracted from data already present in the authoring tool.

If, however, a video presentation or other video content has been created using low-end tools that allow basic interaction and recording but do not support advanced synthesis of presentation scenarios, then the system may use an extensive technology pool 590 to parse presentation scenes. The pool 590 may include facial recognition 590a and enhanced flavors of facial recognition such as facial expression/emotion recognition for analyzing presenter behaviors, image recognition 590b for identifying and categorizing various types of objects in the presentation scenes, OCR and other types of text recognition 590c for transcribing text on slides and other objects, including scene backgrounds, speech recognition 590d, and variants of speech recognition such as speech emotion recognition, gesture and pose recognition 590e, and other technologies.

Figure 6:
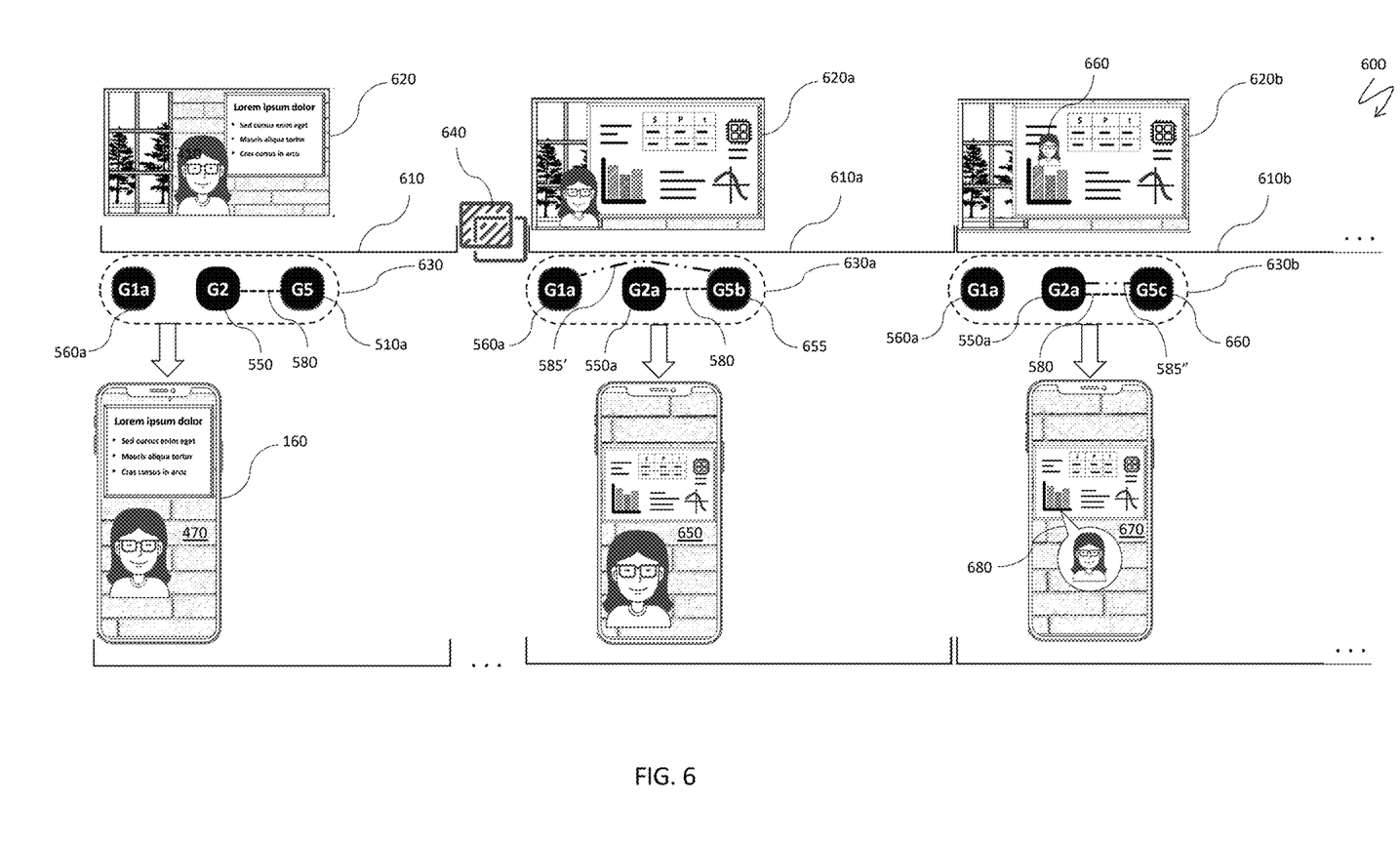
FIG. 6 is a schematic illustration of building and mapping of a presentation storyboard, according to an embodiment of the system described herein.

FIG. 6 is a schematic illustration 600 of building and mapping of a presentation storyboard. As was explained in connection with FIG. 5, scene graphs built for presentation scenes (frames) of a video presentation or other video content may have dynamic sets of objects and edges resulting in different mapping requirements onto a target device for different parts of the source video. Therefore, the system may build a presentation storyboard where a new segment starts when the presentation frame experiences significant changes, causing modification of the scene graph.

FIG. 6 contains three storyboard segments 610, 610a, 610b. Changes in the video presentation necessitating split into the segments 610, 610a, 610b are illustrated by base frames 620, 620a, 620b marking a start of each of the segments 610, 610a, 610b, and associated scene graphs 630, 630a, 630b.

The scene graph 630 is built for the base frame 620 and uses slightly modified notations of FIG. 5: the presenter 510a (node G5) explains a slide from the slide deck 515 (not shown in FIG. 6, see FIG. 5 for more information) embodied by the node 550 (G2) on the background G1a corresponding to a hypernode 560a (G1a), which is a derivative of the background hypernode 560 in FIG. 5 where the shader 530 is deleted and not shown in FIG. 6. The edge 580 in the scene graph 630 reflects the interaction of presentation type, as described in FIG. 5 and in the accompanying text.

The base frame 620a of the second fragment 610a of the presentation storyboard differs from the base frame 620 in several components, justifying the changes in the scene graph 630a:

A slide 550a (node G2a) has been changed from a simple text to a complex content containing a table, an image, two graphs, and an accompanying text shown by black lines. Because of the complexity of the slide 550a, the slide 550a has been enlarged and occupies a major portion of the screen.

Accordingly, a size of an image of a presenter 410b is changed to avoid obstructing content of the slide 550a, which causes a change in the nodes 510a→655 (G5→G5b); the presenter 550 must also be moved closer to the edge of the frame for the same reason, which introduces an additional edge 585' of the alignment type, showing interaction between the presenter 655 and the background 560a.

Because of significant difference between the fragments 610 and 610a, a video transition section 640 has been added at the end of fragment 1.

The scene graph 630b for the base frame 620b of the third storyboard fragment 610b uses the same background 560a and slide 550a (nodes G1a, G2a of the scene graph 630b) as the previous fragment 620a and the corresponding scene graph 630a; the difference is the size and location of an image 660 of the presenter (node G5c), which has been aligned with a portion of the slide content imitating a pointer and helping presentation understanding by the audience. Accordingly, the new scene graph 630b has one new node 660 (G5c) and one new edge 585" of the alignment type (see FIG. 5 for definitions of edge types).

The storyboard and segments of the storyboard add flexibility and efficiency to mapping of the video presentation and other video content. In FIG. 6, each of the three fragments 610, 610a, 610b and the corresponding screen graphs 630, 630a, 630b are mapped onto the target smartphone screen 160 using a template-driven non-linear mapping, explained in FIG. 4 and the accompanying text; however, mapping details are adapted to parameters of the screen graphs. Specifically, the first mapping 470 of the fragment 610 is the same as in FIG. 4. The second mapping 650 is adapted to the width of the slide 550a and puts an image of the presenter 655 in the center of the target screen 160, moving the image down the screen. The third mapping 670 uses an additional mapping feature designed for smaller screens and for certain form factors: repeating the original resizing and alignment 660 on the mobile screen 680 would not work because of rescaling of the image of the presenter to a very small size. To overcome the potential issue without losing the pointing capability of a relocated image of the presenter, the mapping 670 may use a special pointer 680 aiming at the slide content being explained at a given moment, with a live image of the presenter inside the pointer 680.

Figure 7:
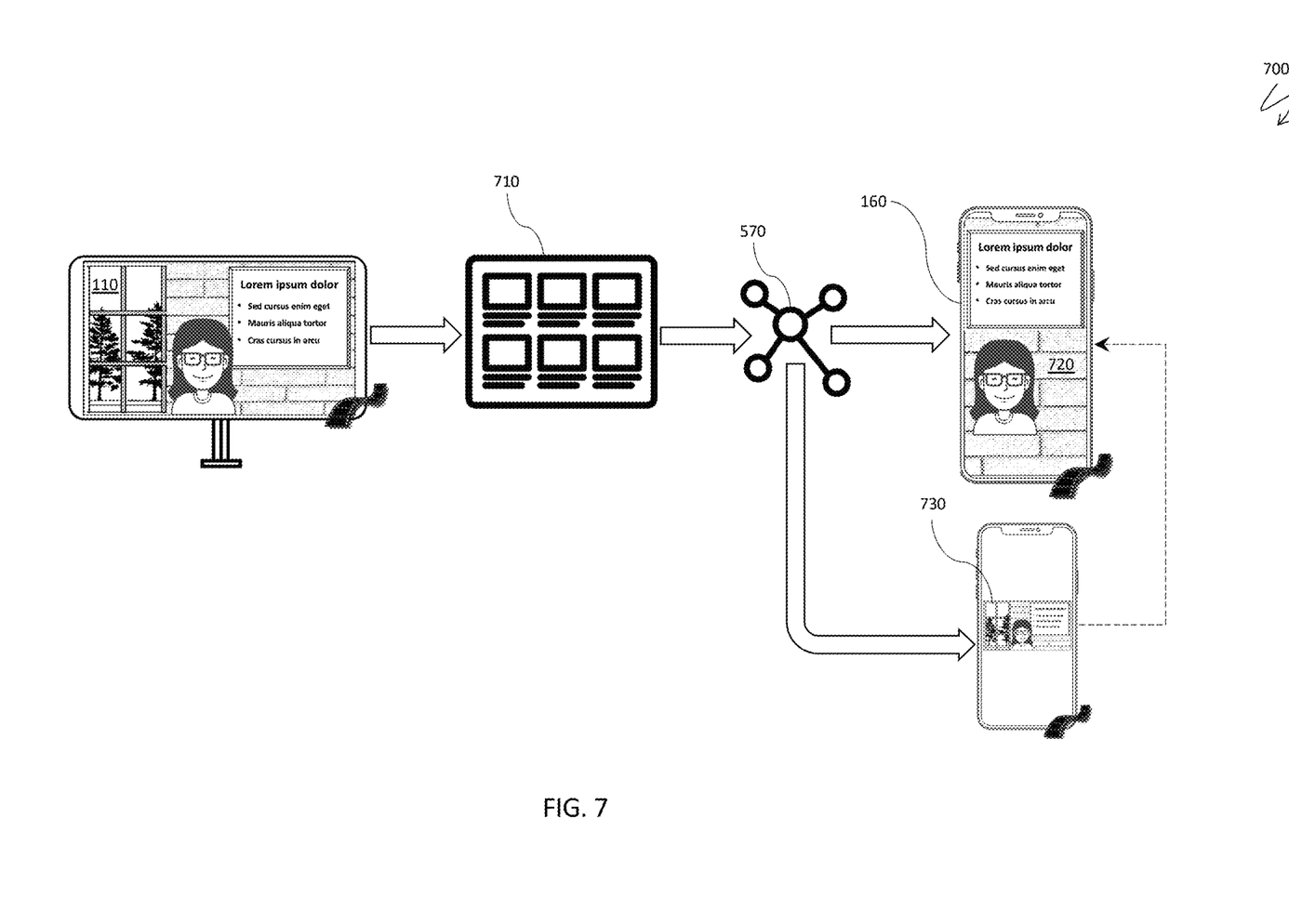
FIG. 7 is a schematic illustration of building and utilizing assistive linear fragments for non-linear mapping, according to an embodiment of the system described herein.

FIG. 7 is a schematic illustration 700 of building and utilizing assistive linear fragments for non-linear mapping. The video presentation 110 or other pre-recorded or live video content is supplied with a storyboard 710 and a corresponding set of scene graphs 570, as explained elsewhere herein (see FIGS. 5, 6 and the accompanying texts). An optimal non-linear mapping 720 of the video presentation 110 to the target device 160 is performed based on the structure and properties of the scene graph 570, as explained, for example, in connection with FIG. 6. While the mapping 720 is optimized for the best viewing experiences on the target screen 160, the mapping still deviates from the original source video and may cause a degree of confusion and questions from a user who does not see the original presentation. To alleviate the issue, a set of assistive fragments synchronous with the replay of the video content on the target device and produced using a linear mapping with straightforward rescaling may be stored next to the non-linear mapping (see FIGS. 2, 3 for details of linear mappings). The user may replay relevant assistive fragments and refer to frames 730 of the assistive fragments for clarification of the non-linearly mapped video content.

Figure 8:
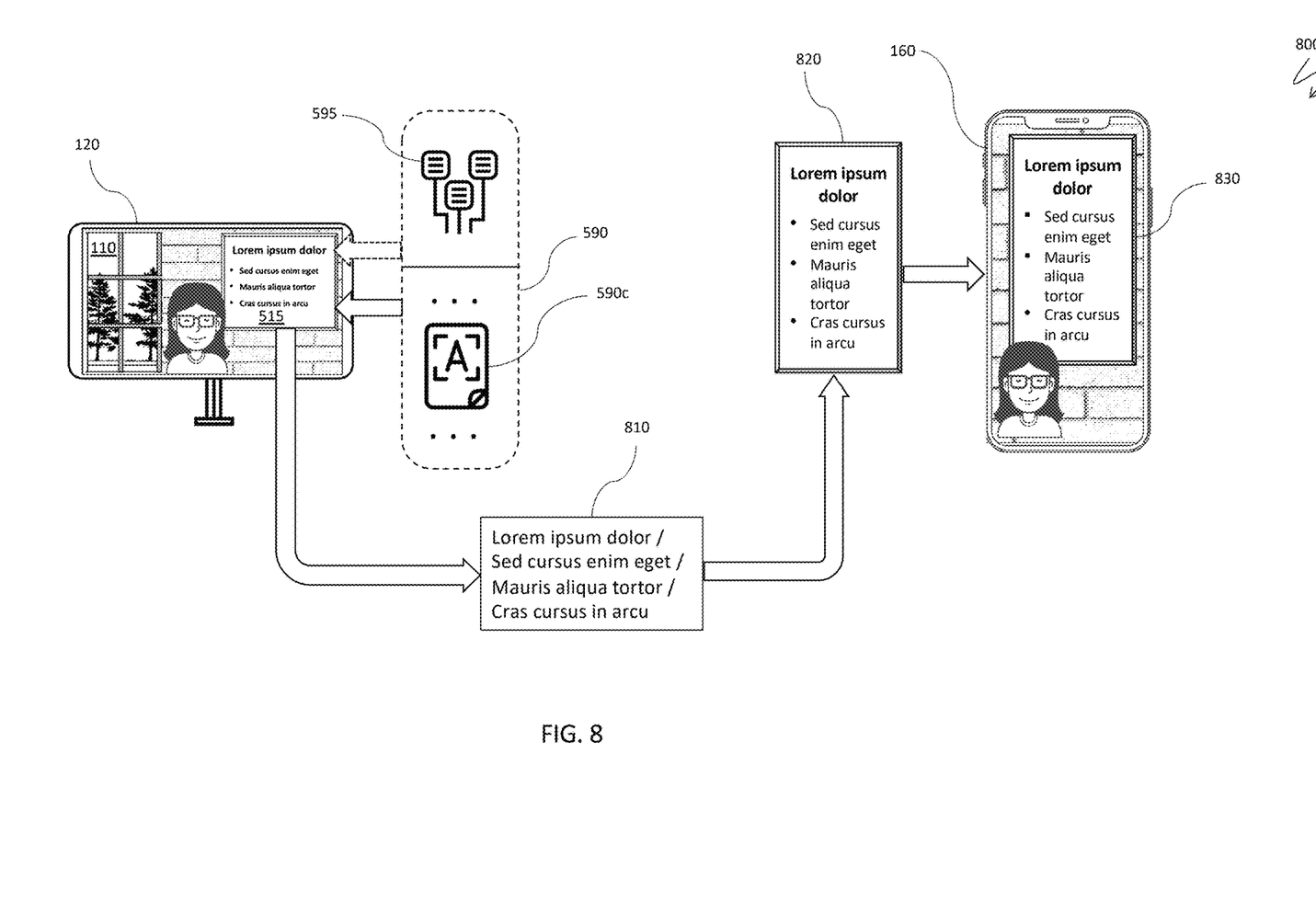
FIG. 8 is a schematic illustration of advanced processing and mapping of text slides, according to an embodiment of the system described herein.

FIG. 8 is a schematic illustration 800 of advanced processing and mapping of text slides. The video presentation 110 includes the slide deck 515 in some of the frames of the video presentation 110, formatted in such way that a straightforward rescaling to the target screen 160 may render the text illegible. To optimize text rendering on target screens, the system first recognizes the text and formatting of the text on the slide deck 515. Analogously to FIG. 5, the system may obtain an existing copy of the text and formatting styles of the text through the authoring scenario 595 stored in the authoring tool originally used for creating the video content. Alternatively, if such copy does not exist or is unavailable for the system, the text and formatting of the text may be restored using the technology pool 590 that includes, for example, optical character recognition technology or other text recognition technologies 590c. A resulting copy of the text 810 may be reformatted into a target screen friendly display 820 and subsequently added as a component 830 of mapping to the target device screen 160.

Figure 9:
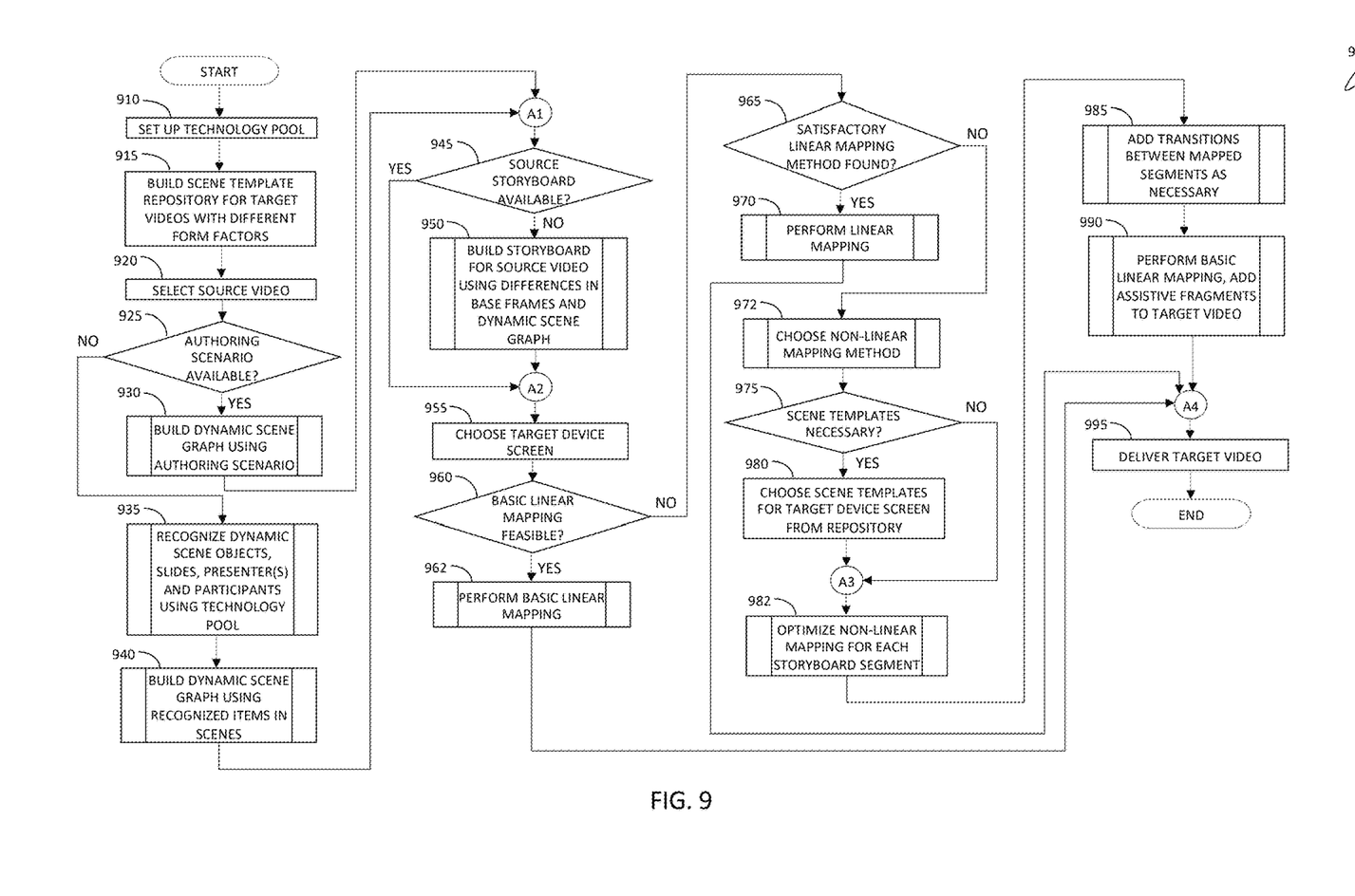
FIG. 9 is a system flow diagram illustrating system functioning in connection with optimal mapping of video presentations, according to an embodiment of the system described herein.

Referring to FIG. 9, a system flow diagram 900 illustrates system functioning in connection with optimal mapping of video presentations. Processing begins at a step 910, where a technology pool for the system is set up (see item 590 in FIG. 5 and the accompanying text). After the step 910, processing proceeds to a step 915, where a scene template repository for target videos with different form factors is created (see FIGS. 1, 4 for details). After the step 915, processing proceeds to a step 920, where a source video is selected. After the step 920, processing proceeds to a test step 925, where it is determined whether an authoring scenario (created in an authoring tool) is available. If so, processing proceeds to a step 930, where a dynamic scene graph is built using the authoring scenario, as explained in connection with FIG. 5. After the step 930, processing proceeds to a test step 945, where it is determined whether a source storyboard is available from the authoring scenario. If not, processing proceeds to a step 950, where the system builds the storyboard for the source video using differences in base frames and instances of the dynamic scene graph (see FIG. 6 and the accompanying text for more information). After the step 950, processing proceeds to a step 955, where a target device screen is chosen. (Note that the step 955 may be independently reached from the test step 945 if it is determined that the source storyboard is available from the authoring scenario.)

After the step 955, processing proceeds to a test step 960, where it is determined whether the basic linear mapping is feasible (see FIG. 2 and the associated text for details). If so, processing proceeds to a step 962, where the system performs the basic linear mapping to create the target video. After the step 962, processing proceeds to a step 995, where the system delivers the target video. After the step 995, processing is complete.

If it is determined at the test step 960 that the basic linear mapping is not feasible (see FIG. 2 for more information), processing proceeds to a test step 965, where it is determined whether a satisfactory linear mapping has been found for the target device screen. If so, processing proceeds to a step 970, where the identified linear mapping is performed by the system. After the step 970, processing proceeds to the step 995, which may be independently reached from the step 962.

If it is determined at the test step 965 that a satisfactory linear mapping has not been found for the target device screen, processing proceeds to a step 972, where a non-linear mapping is chosen for the target screen. After the step 972, processing proceeds to a test step 975, where it is determined whether the chosen non-linear mapping requires scene templates (see FIG. 4 and the accompanying text). If so, processing proceeds to a step 980, where scene template (s) are chosen for the target device screen from the repository. After the step 980, processing proceeds to a step 982, where a non-linear mapping to the target screen is optimized for each storyboard segment, as explained in FIG. 6 and the accompanying text. (Note that the step 982 may be independently reached from the test step 975 if it is determined that scene templates are unnecessary.) After the step 982, processing proceeds to a step 985, where transitions between the mapped segments are added as necessary (see FIG. 6 for an illustration and explanations). After the step 985, processing proceeds to a step 990, where the system performs the basic linear mapping and adds assistive fragments to a target video, as explained in FIG. 7 and in the accompanying text. After the step 990, processing proceeds to the step 995, which may be independently reached from the steps 962, 970.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: IOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of mapping a source video stream to a screen of a target device, comprising:
    capturing the source video stream using an original capturing device having a particular form factor, screen resolution, and aspect ratio, the original capturing device having a different aspect ratio than the target device;
    extracting separate objects from the source video stream;
    identifying a subset of the objects that are key presentation items;
    scaling the key presentation items that are to be placed in a presentation area of the screen of the target device, wherein a scaling amount applied to at least one of the key presentation items is different from a scaling amount applied to an other one of the key presentation items for a same target device; and
    creating a target video stream that is displayed on the target device by arranging the key presentation items that have been scaled based on the aspect ratio of the target device being different from the aspect ratio of the original capturing device.

2. The method of claim 1, wherein the presentation area includes at least one presenter and presentation materials.

3. The method of claim 2, wherein the presentation materials include at least one of: slides, videos, or demonstration models.

4. The method of claim 1, wherein extracting separate objects includes building a scene graph that represents interactions between the objects and other activities and processes occurring in the source video stream.

5. The method of claim 4, wherein edges of the scene graph represent relationships of objects connected by the edges.

6. The method of claim 4, wherein building the scene graph includes accessing data from a video authoring tool that is used to create the source video stream.

7. The method of claim 4, further comprising:
    building a sequence of segments corresponding to different ones of the scene graphs at different times; and
    building a storyboard based on differences between time adjacent ones of the segments.

8. The method of claim 7, wherein the objects are rearranged to enhance the presentation area on the screen of the target device in response to one of the segments causing at least a portion of the presentation area to be deemphasized.

9. The method of claim 1, wherein a template is used to provide replacement recommendations for the key presentation items and default or recommended positions and sizes of for the key presentation items.

10. The method of claim 9, wherein the template includes an area designated for an image of a presenter and an area designated for a slide deck referenced by the presenter.

11. The method of claim 10, wherein the template includes an area that is an overlap of the area designated for the image of the presenter and the area designated for the slide deck.

12. The method of claim 10, wherein the template positions the slide deck proximal to a top right corner of the screen of the target device and the slide deck is sized to fit up to 10% from a left edge of the screen of the target device and up to 15% from a bottom edge of the screen of the target device.

13. The method of claim 12, wherein the template sizes the image of the presenter to be up to 50% of a height of the target video stream that is displayed on the target device and is positioned to be located left of a left edge of the slide deck.

14. The method of claim 10, wherein none of the objects correspond to a slide deck and wherein the template sizes the image of a presenter to be up to 70% of a height of the target video stream that is displayed on the target device and positions the image of the presenter to be in a middle section of a bottom portion of the target video stream that is displayed on the target device.

15. The method of claim 10, wherein the template positions the slide deck at a top right corner of the screen of the target device and is sized to fit up to 1% from a left edge of the screen of the target device and up to 2% from a bottom edge of the screen of the target device.

16. The method of claim 15, wherein the template sizes the image of the presenter to be up to 30% of a height of the target video stream that is displayed on the target device and is positioned to be located below a bottom edge of the slide deck.

17. The method of claim 10, wherein none of the objects correspond to a slide deck and wherein the template sizes the image of a presenter to be up to 50% of a height of the target video stream that is displayed on the target device and positions the image of the presenter to be in a center portion of the target video stream that is displayed on the target device.

18. The method of claim 1, wherein a separate video stream corresponding to a linear mapping of the source video stream onto a target device is provided in addition to the target video stream.

19. The method of claim 1, wherein linear mapping with direct rescaling is used to represent objects from the source video stream onto the target device using relative parameters of the objects.

20. The method of claim 19, wherein the relative parameters include at least one of: object sizes, object locations, object motion, object resizing, object fading, object morphing, or object transparency.

21. The method of claim 1, wherein the presentation materials contain text that is reformatted on the target device to enhance the presentation area.

22. The method of claim 1, wherein the scaling amount applied to at least one of the key presentation items depends, at least in part, upon presence of particular other ones of the presentation items.

23. A non-transitory computer readable medium containing software that maps a source video stream to a screen of a target device, the software comprising:
    executable code that captures the source video stream using an original capturing device having a particular form factor, screen resolution, and aspect ratio, the original capturing device having a different aspect ratio than the target device;
    executable code that extracts separate objects from the source video stream;
    executable code that identifies a subset of the objects that are key presentation items;
    executable code that scales the key presentation items that are to be placed in a presentation area of the screen of the target device, wherein a scaling amount applied to at least one of the key presentation items is different from a scaling amount applied to an other one of the key presentation items for a same target device; and
    executable code that creates a target video stream that is displayed on the target device by arranging the key presentation items that have been scaled based on the aspect ratio of the target device being different from the aspect ratio of the original capturing device.

24. The non-transitory computer readable medium of claim 23, wherein the scaling amount applied to at least one of the key presentation items depends, at least in part, upon presence of particular other ones of the presentation items.

25. A method of mapping a source video stream to a target video stream for display on a screen of a target device, comprising:
    capturing the source video stream using an original capturing device having a particular form factor, screen resolution, and aspect ratio, the source video stream including a plurality of moving visual images that change over time;
    extracting separate objects from the source video stream at different times;
    identifying a subset of the objects that are key presentation items that are to be placed in a presentation area of the target video stream according to a template that enhances the screen of the target device, wherein the key presentation items change over time as contents of the source video stream change over time; and
    creating the target video stream that includes a plurality of moving visual images that change over time by arranging the key presentation items that change over time according to the template, wherein at least one of: a form factor, screen resolution, and aspect ratio of the target device is different from the form factor, the screen resolution, and the aspect ratio of the original capturing device.

* * * * *